Nov. 20, 1956   C. HESSERT, JR   2,770,908
COMBINED FISHING SINKER AND LINE SPREADER
Filed Dec. 19, 1952

INVENTOR.
Charles Hessert
BY
Attorneys.

2,770,908

COMBINED FISHING SINKER AND LINE SPREADER

Charles Hessert, Jr., Camden, N. J.

Application December 19, 1952, Serial No. 326,819

4 Claims. (Cl. 43—42.74)

The present invention relates to the art of fishing tackle.

More particularly this invention relates to a combined fishing sinker and line spreader.

Specifically the invention relates to a fishing sinker devised particularly for use in flounder fishing.

In connection with fishing where the fish to be caught hovers very near the bottom, such as is the case with flounders, it is necessary that the sinker be such as to maintain the hooks on or immediately adjacent the bottom and that the line, including the sinker and hooks, be dragged along the bottom when fishing.

Generally speaking, with conventional fishing tackle the sinker which maintains the hooks near the bottom is not always right side up, that is, it is not always in a position that the hooks bear the proper relationship and where more than one hook is attached to a line, utilizing conventional sinkers, it often happens that the hooks become entangled with one another and thus snarl the line and minimize the chances of a catch.

It is therefore a principal object of the present invention to provide a simple, economical sinker structure which will effectively maintain the line or lines near the bottom when fishing, and which will minimize the tendency, where plural hooks are utilized, of having the hooks becoming entangled with one another or with the line.

It is a further specific object to provide a combined sinker and line spreader of such shape and characteristics as to facilitate movement of the fishing tackle along the bottom and thus prevent entanglement of the line and sinker with under-water obstacles.

A further specific object is to provide in conjunction with a sinker of the characteristics aforementioned, a fishing tackle arrangement in which a strike is transmitted to the line through the sinker without the fisherman feeling the weight affect of the sinker.

Figure 1:
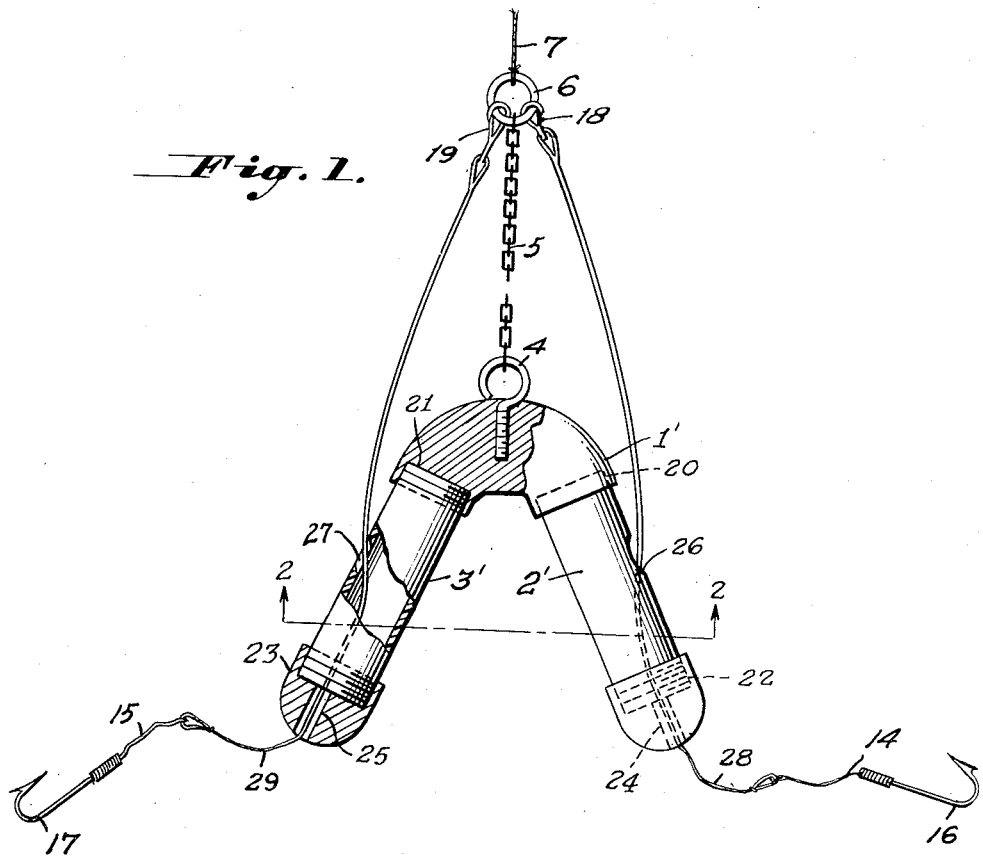
Figure 2:
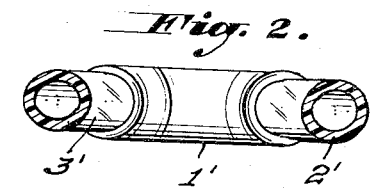

Further and more specific objects will be apparent from the accompanying drawings, in which:

Figure 1 illustrates a fishing tackle in accordance with the invention in an elevational view, and partly in section, and Figure 2 is a cross-sectional view taken along line 2—2 of Figure 1.

The invention comprises a lead or aluminum body 1' which is V-shaped in plan and includes diverging arms 2', 3'. Each arm consists of a plastic tube which is threaded at its opposite ends and the body 1' is provided with internally threaded sockets 20, 21 to which the inner ends of the tubes are threadedly engaged. The axes of the sockets diverge and lie in a plane common with the plane of the body. On the opposite or the outer ends of the tubes are threaded lead or aluminum bodies 22, 23 having bores 24, 25, respectively, which bores form a continuation of a passage defined by the hollow portion of the arms 2', 3' and cut-out sections 26, 27 thereof.

A screw eye 4 is threaded into the body 1' from the outer perimeter thereof at the apex of its V-shape. The screw eye receives a suitable chain 5 to which is secured a ring 6 carried by a line denoted generally 7. Leaders 28 and 29 are connected at one end by snap hooks 18 and 19 to the ring 6 and the leaders pass through the cut-out portions 26, 27, the hollow tubes 2', 3' and out through the bores 24, 25 of the bodies 22, 23. The free ends of the leaders carry snells 14, 15 to which are secured hooks 16, 17.

The body and the arms are cylindrical in cross-section and is of substantially smooth external contour throughout its extent thereby facilitating sliding of the sinker along the bottom. The length of the arms can be varied to suit conditions and may be six, eight, or ten inches long. Since the arms diverge at an angle of approximately forty-five degrees, the longer the arms, the further the distance between the outer ends thereof. Also, the weight of the sinker will vary in accordance with the material used, and, for example, the total weight may be between 6 and 9 ounces thereby making the sinker easy to handle.

In addition, the V-shape of the arms is such that regardless of the manner in which the sinker strikes the bottom, it will always assume a position in which either one side or the other of the body rests on the bottom.

It thus follows that with the sinker on the bottom the leaders carrying the hooks 16 and 17 which have been passed through the arms of the sinker, are effectively separated so that the hooks are spaced from one another and the tendency of the same becoming entangled with each other is minimized.

Additionally, the smooth contour of the legs or arms of the sinker facilitate sliding of the sinker and hooks along the bottom in fishing, for example, for flounders which hover near the bottom.

The aforedescribed sinker is quite economical to manufacture and very readily replaced. Additionally the V-shaped section of the sinker minimizes the entanglement of the sinker with under-water obstacles.

Furthermore, since the leaders 28 and 29 pass uninterruptedly through the arms and thence are affixed to the ring 6 at the end of the line 7, a strike on either hook 16 or 17 is transmitted directly to the line 7 so that the sinker is undisturbed and thus a very sensitive tackle is provided, that is, one in which the fisherman receives substantially instant communication of the strike or nibble of a fish on the hook.

In connection with the sinker, in order to minimize entanglement of the sinker the edges of the members or lead portions 1' and 22, 23 are rounded as indicated. In addition, the threaded construction permits removal of the legs 2', 3' from body 1' for stowage purposes. Obviously the legs 2', 3' can be in sets of different lengths so that the sets are interchangeable.

Having now described my invention, what I desire to secure by Letters Patent in the United States is:

1. A combined fishing sinker and line spreader comprising a body having laterally spaced sockets therein, the axes of the sockets being in diverging relationship and lying in a plane common with the plane containing the body, hollow tubular members connected within and removable from each socket, and the wall of each tubular member having an aperture therein along the outer side thereof and through which a leader can be passed.

2. A combined fishing sinker and line spreader as defined in claim 1 further including means carried by the body for receiving a fishing line and weighted cap members secured to the outer ends of each tubular member, said cap members having bores therethrough through which the leaders can be threaded, a line secured to said aforementioned means, and means for connecting the leaders to the line at a point in spaced relation with respect to the point of connection with the body.

3. A combined fishing sinker and line spreader as defined in claim 2 in which the body is metal and the tubular members are plastic.

4. A combined fishing sinker and line spreader comprising a substantially V-shaped body, a pair of hollow tubular members, each tubular member being connected to an arm of the V-shaped body so that the longitudinal center lines of said body and arms lie in a common plane with the tubular members being in diverging relationship to the body, and means defining an aperture in the wall of each tubular member along the outer side thereof and through which a leader can be passed.

References Cited in the file of this patent

UNITED STATES PATENTS

| | | |
|---|---|---|
| 2,170,067 | Stephen | Aug. 22, 1939 |
| 2,201,351 | Skoverski | May 21, 1940 |
| 2,577,143 | Midland | Dec. 4, 1951 |
| 2,592,741 | Ristine | Apr. 15, 1952 |